(No Model.)

L. F. CHENOWETH.
HOG PEN.

No. 349,480. Patented Sept. 21, 1886.

WITNESSES:
C. Neveux
C. Sedgwick

INVENTOR:
L. F. Chenoweth

BY Munn & Co
ATTORNEYS.

UNITED STATES PATENT OFFICE.

LEWIS F. CHENOWETH, OF MILLERTON, KANSAS.

HOG-PEN.

SPECIFICATION forming part of Letters Patent No. 349,480, dated September 21, 1886.

Application filed May 3, 1886. Serial No. 201,019. (No model.)

*To all whom it may concern:*

Be it known that I, LEWIS F. CHENOWETH, of Millerton, in the county of Sumner and the State of Kansas, have invented a new and Improved Hog-Pen, of which the following is a full, clear, and exact description.

The object of my invention is to provide a new and improved hog-pen especially adapted for breeding-sows.

The invention consists in various parts and details and combinations of the same, as hereinafter more fully described, and pointed out in the claim.

Reference is to be had to the accompanying drawings, forming a part of this specification, in which similar letters of reference indicate corresponnding parts in both the figures.

Figure 1:
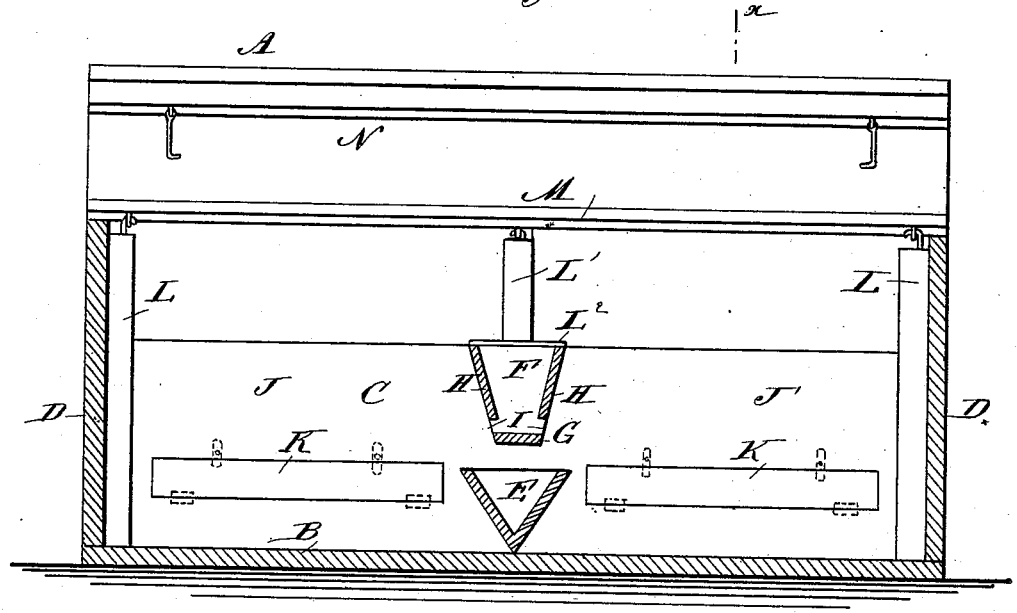
Figure 2:
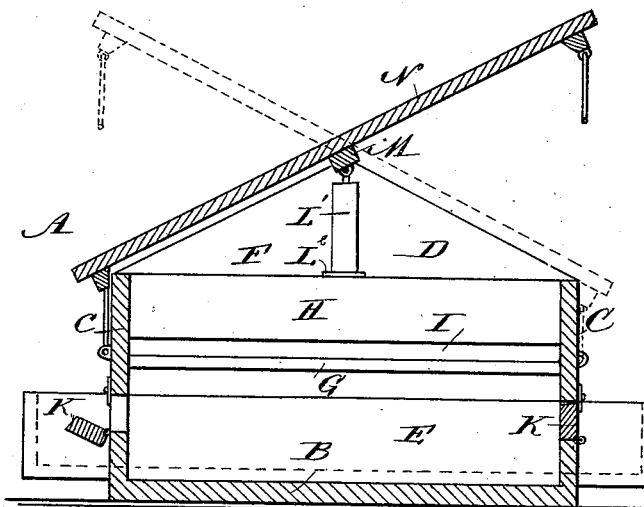

Figure 1 is a longitudinal sectional elevation of my improvement, and Fig. 2 is a vertical cross-section of the same on the line $x$ $x$ of Fig. 1.

The hog-pen H is provided with a bottom, B, to which are secured the sides C and the end walls, D, which project above the sides C, slanting toward the center of the pen from each top edge of the sides C.

In the center of the hog-pen A, and running transversely across the same, is the V-shaped trough E, resting with its pointed lower end on the bottom B, and extending a short distance through each of the sides C. A short distance above the trough E is placed the feed-box F, attached to the sides C of the pen A, and provided with a bottom, G, and the slanting sides H, which are placed a short distance above the bottom G, so as to form the feed-holes I on each side of the feeding-box F. It will be seen that the trough E and the feeding-box F divide the hog-pen into the two compartments J and J', each of which is provided with the ventilating-doors K, hinged to each of the sides C. To the inside, in the middle, of each end wall, D, is attached a post, L, and a similar post, L', is erected on a cross-piece, L², placed across the top edges in the center part of the slanting sides H of the feed-box F. To the upper ends of the three posts L L and L', is hinged in any suitable manner the longitudinal beam M, attached to the roof N, which reaches to the outer edge of each end wall, D, and can be swung into an inclined position and fastened in any suitable manner to either of the sides C, as shown in full and dotted lines in Fig. 2.

As the roof N leaves one-half of the top of the pen A open, it permits of placing the feed into the feed-box without disturbing any of the parts of the pen. The animals can reach the feed in the feed-box through the transverse slots, and whatever feed is spilled through the slot drops into the trough below.

The water or other fluid feed is placed into the trough from the outside from either side, and the animals in both compartments can feed from the feed-box and the trough without disturbing each other.

The adjustability of the roof permits the use of the pen in all kinds of weather, in summer or winter.

Having thus fully described my invention, I claim as new and desire to secure by Letters Patent—

The herein-described hog-pen, consisting of the bottom B, the sides C, the end walls, D, projecting above the sides and slanting toward the center, the posts L L', the centrally-pivoted roof N, the trough E, the feed-box F, and the hinged ventilators K, as specified.

LEWIS F. CHENOWETH.

Witnesses:
J. H. SPARKS,
A. J. CHAPLIN.